US007199907B2

(12) United States Patent
Shimizu

(10) Patent No.: US 7,199,907 B2
(45) Date of Patent: Apr. 3, 2007

(54) IMAGE PROCESSING APPARATUS, CONTROL METHOD OF IMAGE PROCESSING APPARATUS, CONTROL METHOD, MEMORY MEDIUM AND PROGRAMS

(75) Inventor: Yasushi Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 10/329,377

(22) Filed: Dec. 27, 2002

(65) Prior Publication Data

US 2003/0137701 A1 Jul. 24, 2003

(30) Foreign Application Priority Data

Jan. 18, 2002 (JP) ............................ 2002-010596

(51) Int. Cl.
*H04N 1/40* (2006.01)
*H04N 1/00* (2006.01)
*H04N 1/32* (2006.01)

(52) U.S. Cl. ..................... 358/448; 358/400; 358/403; 358/437

(58) Field of Classification Search ................ 358/448, 358/400, 403, 437, 468
See application file for complete search history.

(56) References Cited

U.S. PATENT DOCUMENTS 5,781,825 A * 7/1998 Okamoto ..................... 399/17
6,061,152 A * 5/2000 Nihei et al. ................. 358/448
6,342,954 B1 * 1/2002 Hisatomi et al. ........... 358/403

* cited by examiner

*Primary Examiner*—Jerome Grant
*Assistant Examiner*—Houshang Safaipour
(74) *Attorney, Agent, or Firm*—Fitzpatrick, Cella, Harper & Scinto

(57) ABSTRACT

For the purpose of omitting troublesome operations in page printing, and improving operability, when a page information output mode is specified, a continuous-read mode is automatically started up under specific conditions, and image information having page information added thereto is output from the image output section.

30 Claims, 8 Drawing Sheets

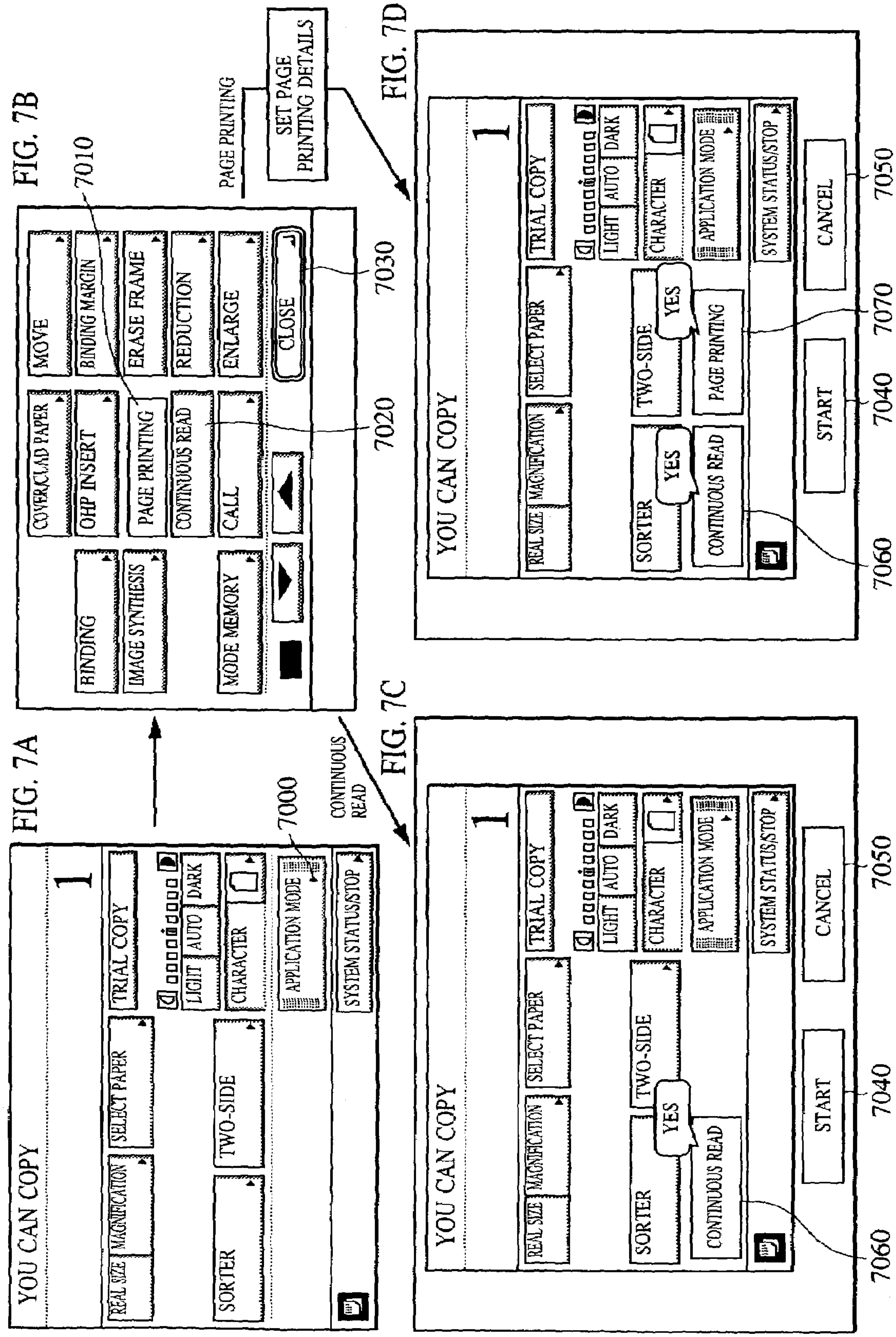
FIG. 7A
YOU CAN COPY
1
REAL SIZE
MAGNIFICATION
SELECT PAPER
TRIAL COPY
LIGHT
AUTO
DARK
SORTER
TWO-SIDE
CHARACTER
APPLICATION MODE
7000
SYSTEM STATUS/STOP
FIG. 7B
7010
COVER/CLAD PAPER
OHP INSERT
PAGE PRINTING
CONTINUOUS READ
CALL
MOVE
BINDING MARGIN
ERASE FRAME
REDUCTION
ENLARGE
BINDING
IMAGE SYNTHESIS
MODE MEMORY
CLOSE
7020
7030
PAGE PRINTING
SET PAGE PRINTING DETAILS
CONTINUOUS READ
FIG. 7C
YES
CONTINUOUS READ
START
CANCEL
7040
7050
7060
FIG. 7D
YES
PAGE PRINTING
7070

IMAGE PROCESSING APPARATUS, CONTROL METHOD OF IMAGE PROCESSING APPARATUS, CONTROL METHOD, MEMORY MEDIUM AND PROGRAMS

BACKGROUND OF THE INVENTION

1. Field of the Invention

The present invention relates to an image processing apparatus such as a digital copying machine capable of printing page information.

2. Description of the Related Art

An image processing apparatus such as a digital copying machine which has information processing means for digital processing and outputting image information of an original entered from a scanner or the like, and which copies the image information of the original onto a recording sheet on the basis of the output of the information processing means, has been conventionally known in general.

In such a digital copying machine, the page number is not recorded on the recording sheet itself used for copying when page information of the original image is available. It was therefore necessary to record the page number on the recording sheet manually.

To solve this problem, a copying machine is proposed in which page information is managed by control means in the copying machine and the page information is printed together with the recording sheet. An image processing apparatus capable of printing page information is thus proposed.

In the above-mentioned conventional digital copying machine, it is conceivable that the function of printing the page number is often used when there are a plurality of entered originals. When a user wishes to enter the original sheet by sheet for an original that is composed of a plurality of pages, or when the user is obliged to do so, however, there is a risk that a desired page number, such as the starting page number, cannot be validated.

To solve the above-mentioned problem, an apparatus making it possible to process some bundles of originals each composed of a plurality of pages by treating them as one-by-one-entered originals would be conceivable. In such an apparatus, however, when conducting page printing, the user must perform an operation to validate the printing function for each run of inputting a sheet of the original, perhaps posing the problem of complicated operation.

SUMMARY OF THE INVENTION

An object of the present invention is to provide an image processing apparatus which solves the above-mentioned problem.

Another object of the present invention is to provide an image processing apparatus or the like which permits omission of troublesome operations for the user when conducting page printing, improves operability, and thus solves the aforementioned problem.

According to one aspect of the present invention, these objects are attained in a method of controlling an image processing apparatus that has an image reading section, an image memory section which stores image information read by the image reading section, and an image output section which outputs the image information in the image memory section. The apparatus also comprises page information output specifying means for specifying a page information output mode, continuous read mode executing means which executes processing for continuously reading an image from the image reading section until an instruction of read end is received, and stores the image in the image memory section, and page information adding means which, when the read end instruction is received, adds page information to the image information in the image memory section. The method itself comprises the steps of, when the page information output mode is specified, automatically activating the continuous read mode executing means under prescribed conditions, and outputting the image information and the page information which has been added thereto by the page information adding means from the image output section.

In another aspect, the foregoing objects are attained in a controlling method that comprises a mode selecting step, of causing a user to select a desired image processing mode from a plurality of image processing modes including a first mode, which permits assignment of page number information in units of pages to document data to be processed, and a second mode, which permits handling of a plurality of sets of document data that are independent of each other as document data as a job. The method also includes a controlling step, of bringing the first mode into a valid state and automatically bringing the second mode into a valid state irrespective of whether or not the user has selected the second mode in the mode selecting step, when the user selects said first mode from among the plurality of image processing modes in the mode selecting step.

Still other aspects of the invention are apparatus that perform these methods, and control programs for causing execution of these methods.

Further objects, features and advantages of the present invention will become apparent from the following description of the preferred embodiments (with reference to the attached drawings).

BRIEF DESCRIPTION OF THE DRAWINGS

FIG. 7 illustrates a typical operational screen and a typical transition of the operational screen.

DESCRIPTION OF THE PREFERRED EMBODIMENTS

The preferred embodiments of the present invention will now be described with reference to the drawings.

<Overall Configuration of the System>

Figure 1:
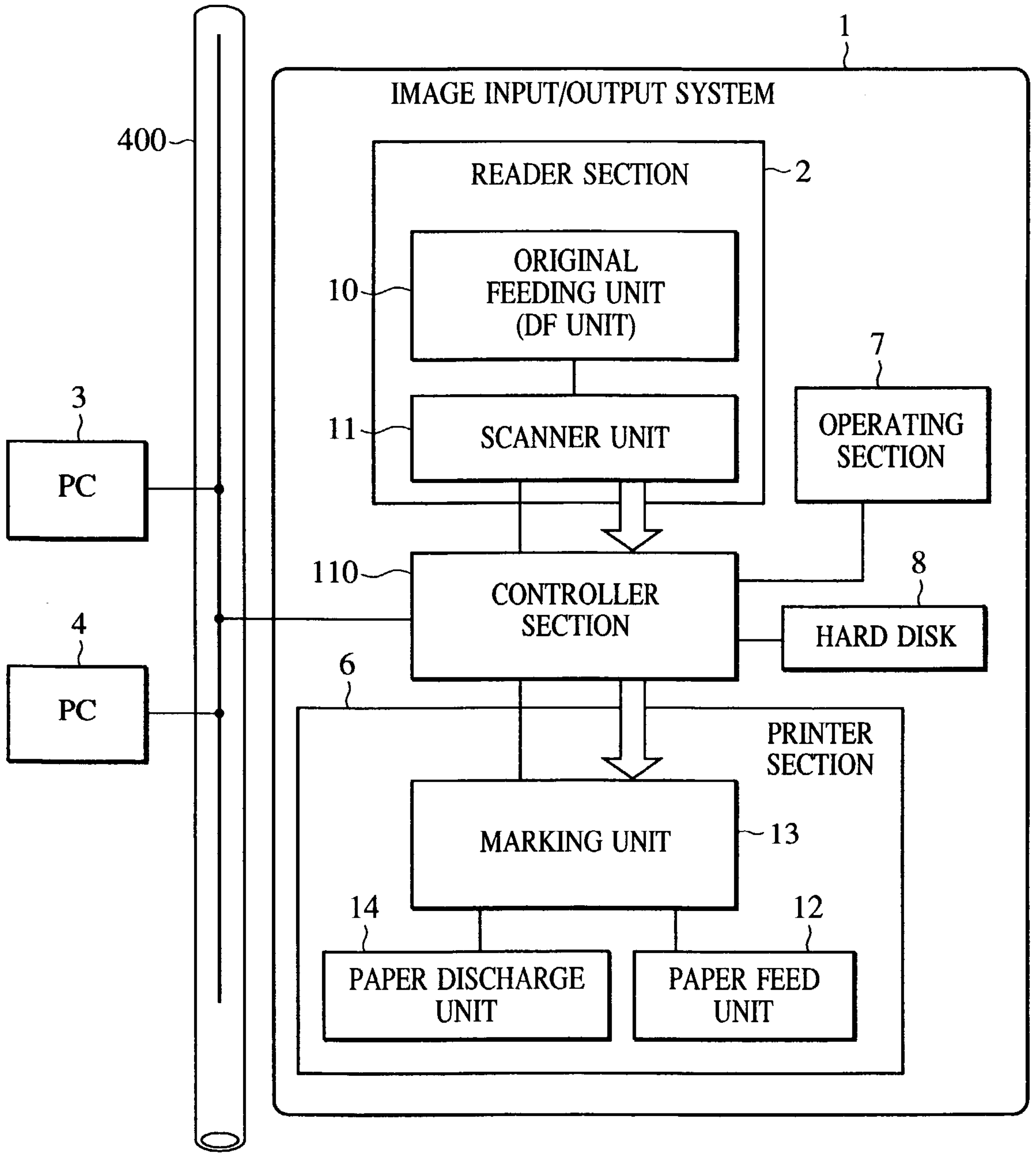
FIG. 1 is a block diagram illustrating the configuration as a whole of the image input/output system of an embodiment of the present invention.

FIG. 1 is a block diagram illustrating the entire configuration of the image input/output system 1 including the image processing apparatus of an embodiment of the present invention.

This image input/output system 1 is connected to host computers 3 and 4 via a LAN ("Local Area Network") 400 such as an Ethernet (trademark). The image input/output system 1 comprises a reader section 2, conducting read processing of image data, and a printer section 6 which performs output processing of image data. An operating section 7 has a keyboard for conducting input/output of the image data and a liquid crystal panel which displays the image data and various functions. An image processing apparatus, having a controller section 110 comprising a single electronic part which mounts a hard disk drive 8 and controls the above-mentioned component elements, is also part of the image input/output system 1*a*. The present invention is applicable to any form including an apparatus having a copying function, an apparatus having a plurality of functions including a copying function, a facsimile function and a printer function, and an apparatus capable of coping with a network.

The reader section 2 has an original feeding unit 10 which conveys original paper, and a scanner unit 11 which optically reads an original image and converts the same into image data as electric signals. The printer section 6 has a paper feed unit 12 having a plurality of paper feed cassettes housing recording sheets of paper, a marking unit 13 which transfers and fixes the image data onto the recording sheet, and a paper discharge unit 14 which applies sorting or staple processing to the printed recording sheet and discharge the same outside. A data input source other than the above-mentioned reader section 2 can also be used; for example, it is possible to enter data from information processing apparatus such as external computers (including PC3 and PC4) via various communication media such as a LAN and a WAN (Wide Area Network"). Printing of these data is also possible.

The original feeding unit 10 has two original trays capable of loading a plurality of originals. The original feeding unit 10 has an original conveying function of conveying the original placed on one of the original trays to a prescribed read position on a platen glass 15, and also conveying another original placed on the other tray to the other original tray. The number of originals can be detected from the number of runs of original conveyance conducted by the original conveying function. In this embodiment, as described above, it is possible to confirm the number of sheets of the entered document data.

<Details of the reader section 2 and the printer section 6>

Figure 2:
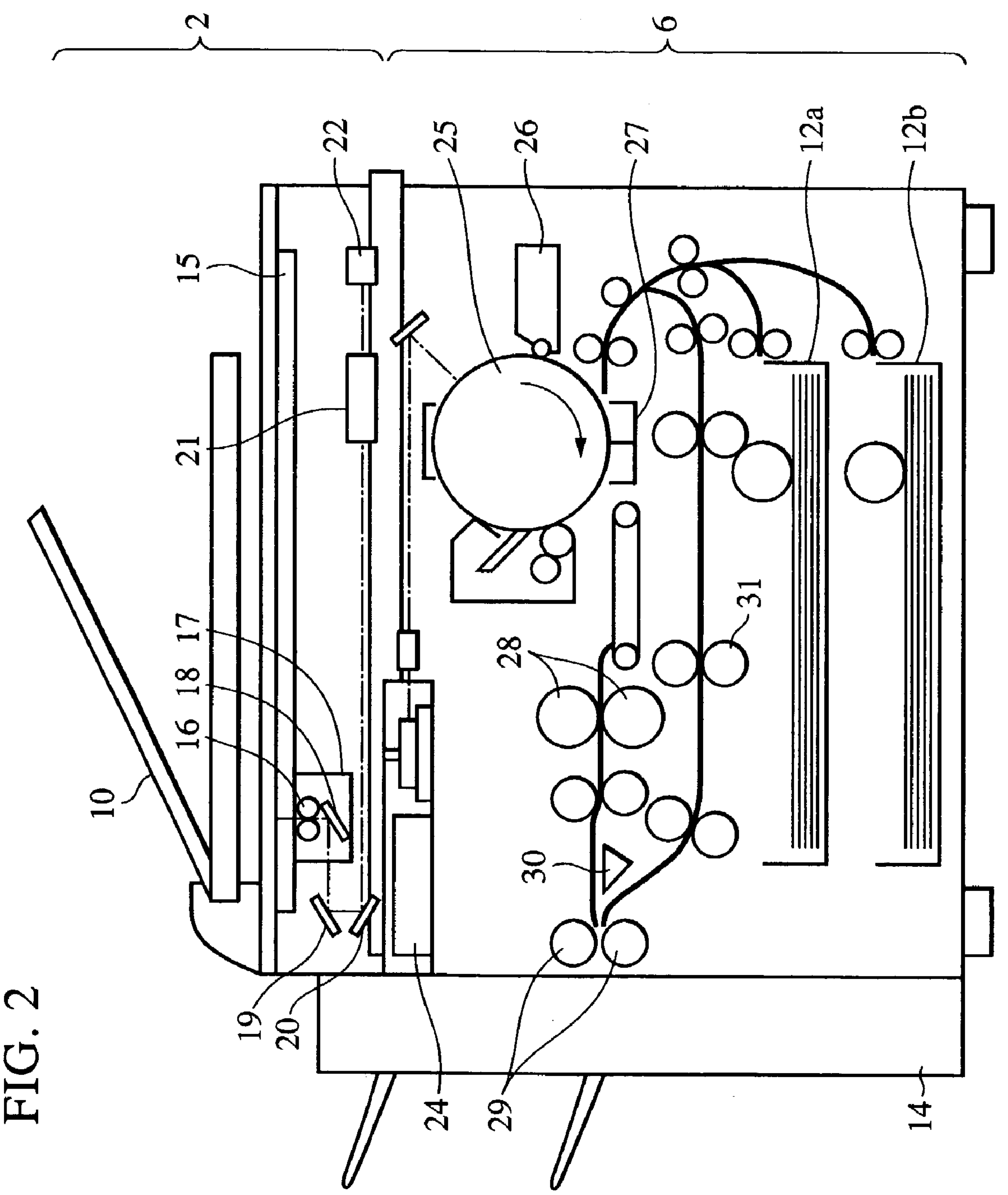
FIG. 2 is an internal structural diagram illustrating details of the reader section 2 and the printer section 6.

FIG. 2 is an internal structural diagram illustrating details of the reader section 2 and the printer section 6.

The reader section 2 is placed on the printer section 6. In the reader 2, sheets of original piled up on the original feeding unit 10 are fed sequentially one by one from top to bottom onto the platen glass 15, and after prescribed read operation in the scanner unit 11, the read sheets of original are discharged from the platen glass 15 onto the original feeding unit 10.

In the above-mentioned scanner unit 11, upon conveyance of the sheets of original onto the platen glass 15, a lamp 16 is turned on, and then, displacement of an optical unit 17 is started to illuminate the original sheet from below for scanning. The light reflected from the original sheet is introduced into a CCD image sensor (hereinafter simply denoted as "CCD") 22 via a plurality of mirrors 18 to 20 and a lens 21. The original image thus sensed is read by the CCD 22. The image data read in the CCD 22 is subjected to a prescribed processing, and is then transferred to the controller section 110 (omitted in FIG. 2).

By scanning the original sheet placed on the platen glass 15 by illuminating the same by the lamp 16 from below, it is possible to read the scanned original image by means of the CCD 22.

The image data delivered from the reader section 2 in the above-mentioned steps is sent to the controller section 110 via a connector 56.

Then in the printing section 6, a laser beam corresponding to the image data output from the controller section 110 is emitted from a laser emitting section 24 driven by a laser driver 23. An electrostatic latent image corresponding to the laser beam is formed on the photosensitive drum 25 of the marking unit 13, and a developing agent is deposited onto the portion of the electrostatic latent image by a developing unit 26.

At a timing synchronized with the start of irradiation by the laser beam, on the other hand, a recording sheet is fed from a paper feed unit 12 (paper feed cassettes 12*a* and 12*b*), is conveyed to a transfer section 27, and transfers the developing agent deposited on the photosensitive drum 25 onto the recording sheet. The recording sheet bearing the thus transferred image data is conveyed to a fixing section 28, and the image data is fixed onto the recording sheet through heating and pressure processing in the fixing section 28.

In the recording of image data on one side of a recording sheet, the recording sheet which has passed through the fixing section 28 is discharged as it is by a discharge roller 29 onto a paper discharge unit 14. The paper discharge unit 14 sorts the recording sheets by making bundles of the discharge recording sheets, and applies staple processing to the sorted recording sheets.

In two-side-recording image data onto the recording sheet, the recording sheet is conveyed to the discharge roller 29. The rotating direction of the discharge roller 29 is then reversed. The recording sheet is introduced by a flapper 30 into a paper refeeding path 31, and is conveyed to the transfer section 27 in the same manner as above.

The controller section 110 is composed of a single electronic part as described above and has a scanner function of converting image data read by the reader section 2 into a code, and transmit the converted result to the host computers 3 and 4 via the LAN 400, a printer function of converting the code data received from the host computers 3 and 4 into image data and outputting the converted image data to the printer section 6, and other function blocks.

<Details of the Controller Section 110>

Figure 3:
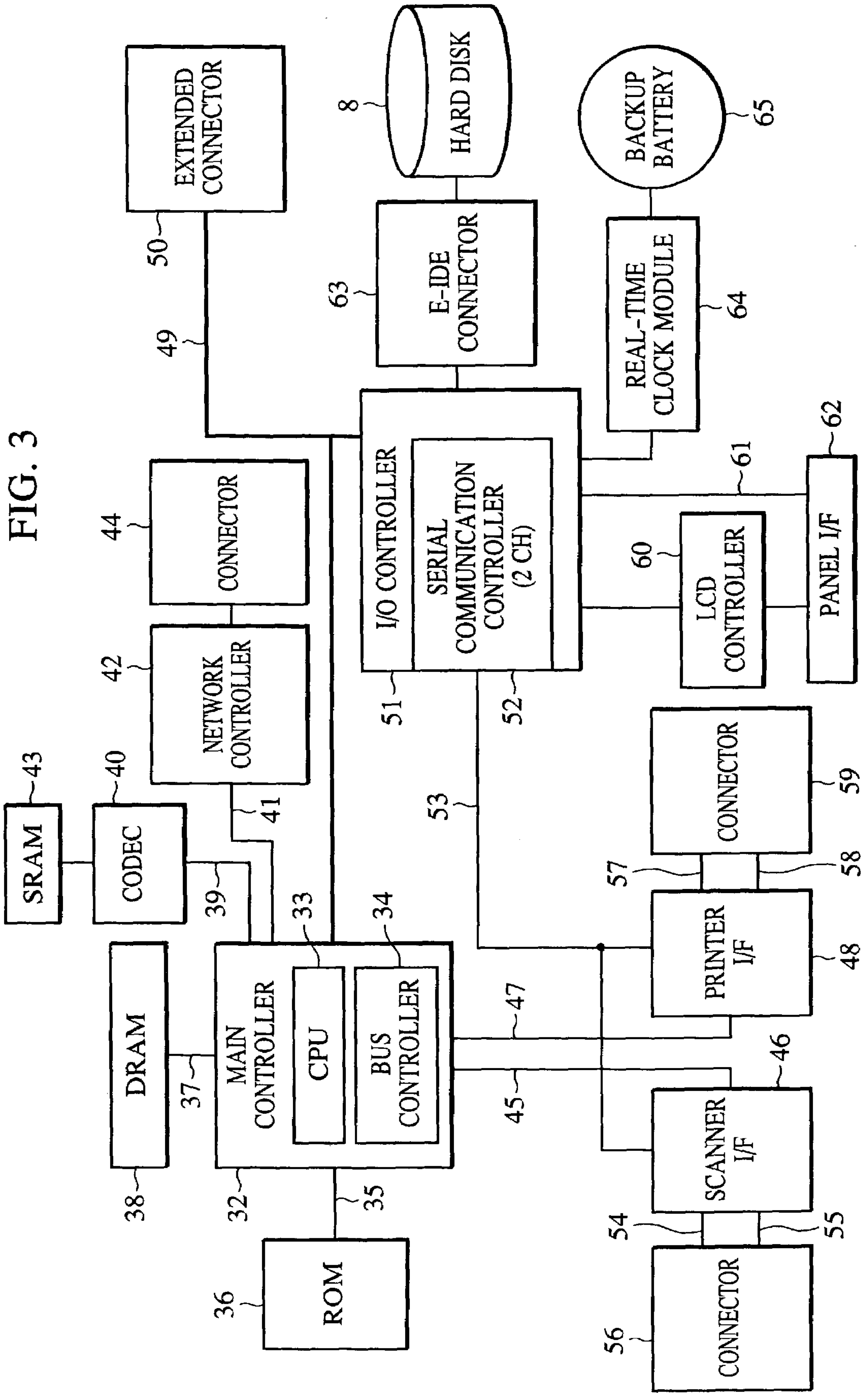
FIG. 3 is a block diagram illustrating details of the controller section 110.

FIG. 3 is a block diagram illustrating details of the controller section 110.

The controller section 110 has a main controller 32. This main controller 32 has a CPU 33, a controller 34 and a functional block including various controller circuits described later, built therein. The main controller 32 is connected to a ROM 36 via a ROM I/F 35, connected to a DRAM 38 via a DRAM I/F 37, connected to a CODEC 40 via a CODEC I/F 39, and connected to a network controller 42 via a network I/F 41.

The ROM 36 stores various control programs executed by the CPU 33 of the main controller 32 and arithmetic data. The DRAM 38 serves as a work area for the operation of the CPU 33 and an area for accumulating image data. The CODEC 40 compresses raster image data accumulated in the DRAM 38 by a known compression method such as MH/MR/MMR/JBIG and extends a compressed data into a raster image. An SRAM 43 is connected to the CODEC 40, and the SRAM 43 serves as a temporary work area for the CODEC 40.

The network controller 42 carries out prescribed control operations with the LAN 400 via the network 44. The above-mentioned main controller 32 is connected to a scanner I/F 46 via a scanner bus 45, connected to a printer I/F 48 via a printer bus 47, and connected to an extension connector 50 and an input/output control section (I/O control section) for connecting an extension board via a general-purpose high-speed bus 49 such as a PCI bus.

The I/O control section 51 has two channels of a start/stop synchronous serial communication controller 52 for transmitting and receiving control commands with the reader section 2 and the printer section 6. The serial communication controller 52 is connected to the scanner I/F 46 and the printer I/F 48 via an I/O bus 53.

The scanner I/F 48 is connected to the scanner connector 56 via a first start/stop synchronous serial I/F 54 and a first video I/F 55, and the scanner connector 56 is connected to the scanner unit 11 of the reader section 2. The scanner I/F 46 applies a desired binarization processing and a magnification processing in the main scanning direction and/or in the sub-scanning direction to the image data received from the scanner unit 11. The scanner I/F generates a control signal on the basis of a video signal received from the scanner unit 11, and transfers the same to the main controller 32 via the scanner bus 45.

The printer I/F 48 is connected to a printer connector 59 via a second start/stop synchronous serial I/F 57 and a second video I/F 58. The printer connector 59 is connected to the marking unit 13 of the printer section 6. The printer I/F 48 applies a smoothing processing to the image data output from the main controller 32, and outputs the resultant image data to the marking unit 13, and outputs a generated control signal to the printer bus 47 on the basis of a video signal received from the marking unit 13.

The CPU 33 operates on the basis of a control program read from the ROM 36 via the ROM I/F 35, interpret for example PDL (Page Description Language) received from the host computers 3 and 4, and performs explosion processing into raster image data.

The bus controller 34 controls transfer of data entered or output from external devices connected to the scanner I/F 46, the printer I/F 48 or other extension connector 50 or the like, and performs arbitration upon occurrence of bus contention and control of DMA data transfer. More specifically, for example, data transfer between the above-mentioned DRAM 38 and the CODEC 40, data transfer from the scanner unit 11 to the DRAM 38, and data transfer from the DRAM 38 to the marking unit 13 are controlled by the bus controller 34, and DMA-transferred.

The I/O control section 51 is connected to the operating section 7 via an LCD controller 60 and a panel I/F 62. Furthermore, the I/O control section 51 is connected to an EEPROM 66 as a non-volatile memory, connected to the hard disk drive 8 via an E-IDE connector 63, and connected to a real-time clock module 64 which updates/stores dates and times of the day managed within the apparatus. The real-time clock module 64 is connected to a backup cell 65 and is backed up by the cell 65 for backup.

<Internal Details of Main Controller 32>

Figure 4:
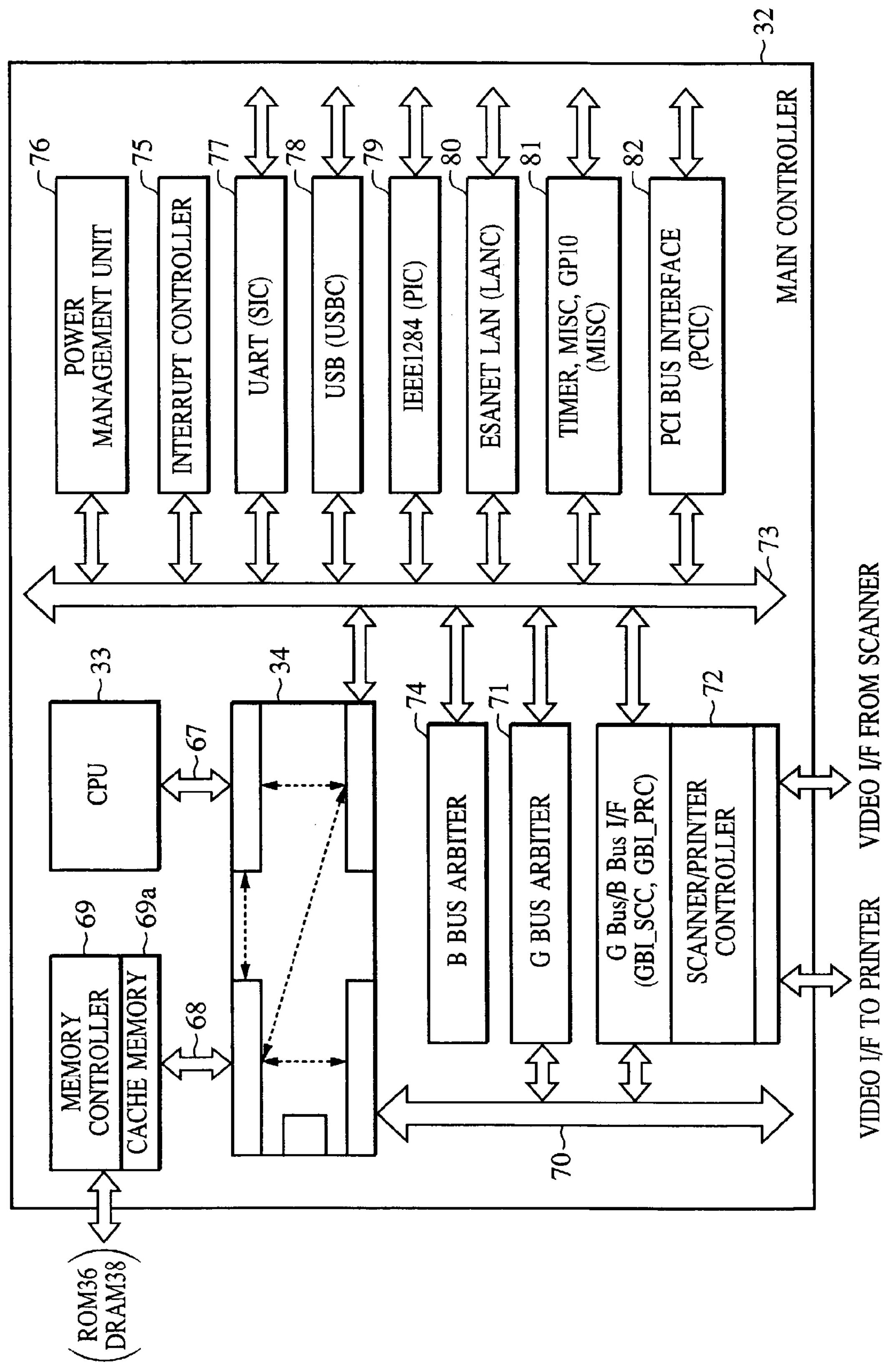
FIG. 4 is a block configuration diagram illustrating the internal details of the main controller 32.

FIG. 4 is a block configuration diagram illustrating internal details of the main controller 32.

The main controller 32 has a bus controller 34. The bus controller 34 is composed of 4×4 64-bit cross bus switches, and is connected to the CPU 33 via a 64-bit processor bus (P bus). The bus controller 34 is connected to a memory controller 69 having a cache memory 69*a* via a special local bus (M bus) 68 for memory. The memory controller 69 is connected to memories such as the ROM 36 and the DRAM 38 to control operations of these memories.

The bus controller 34 is connected to a G-bus arbiter 71 and a scanner/printer controller 72 via a graphics bus (G bus) 70. The bus controller 34 is connected also, via an I/O bus (B bus) 73, to a B-bus arbiter 74, a G-bus arbiter 71, an interrupt controller, various functional blocks, a power management unit 76, a serial I/F controller 77 such as UART, a USB (Universal Serial Bus) controller 78, a parallel I/F controller 79 such as an LEEE 1284, a LAN controller 80, a general-purpose I/O controller 81, a PCI bus I/F 82 governing I/F operations between the B-bus 73 and a PCI bus which is an external bus, and scanner printer controller 72.

The B-bus arbiter 74 provides arbitration for arbitral control of the B-bus 73. The B-bus arbiter 74 receives a bus use request of the B-bus 73, and after arbitration, a use permit is given to a selected master. It thus prohibits simultaneous bus access by two or more masters. The arbitration system has three-stage priority, and a plurality of masters are allocated to each priority.

The interrupt controller 75 accumulates interrupts from the above-mentioned functional blocks and from outside the controller section 110, and redistributes the same to the controllers 72 and 77 to 82 supported by the CPU 33 and non-maskable interrupt ("NMI").

A power management unit 76 manages power for each functional block, and monitors the power consumption of the controller section 110 as an electronic part composed of a single chip. More specifically, the controller section 110 is composed of a large-scale ASIC (IC for specific uses) having a built-in CPU 33. As a result, simultaneous operation of all the functional blocks may generate a large quantity of heat, and this may break the controller section 110 itself.

For the purpose of preventing such circumstances, therefore, the power consumption is managed for each functional block, and the power consumptions of all the functional groups are accumulated in the power management unit. The power management unit 76 totals the power consumptions of the individual functional blocks and monitors the power consumptions of all the functional blocks in a lump so that the power consumption does not exceed a critical power consumption.

A G-bus arbiter 71 arbitration-controls G-bus 70 by the central arbitration method, and has a request signal and a permit signal specifically for each bus master. When giving priority to the bus masters, it is possible to specify any of the fair arbitration mode in which all the bus masters are assumed to have equal priorities and priority is impartially given priority to all bus masters and the priority arbitration mode which permits use of priority for any one of bus masters.

In the image input/output system having the above-mentioned configuration, when the user requests copying of an original on a recording sheet, an operation mode of the copying operation requested by the user can be specified from the operating section 7 of the image input/output system. The operation modes include the page printing operation mode for adding page information such as a page number to input data, forming a feature of the present invention (also called the page print mode or the numbering mode), as well as modes specifying the sequence of input/output such as the two-side scanning mode, the two-side printing mode, the sorting mode and the staple mode, and the modes specifying various types of image processing such as magnification, white/black reversing and mirror image. There are thus a plurality of image processing modes.

In the page printing operation, it is possible to specify positional information of page information to be added to the image information, character size and font information of the page information, color information for characters of the page information, and a page start number of the page information. This permits printing by adding the page number data in units of pages, at a desired position, with a desired size, a desired color and a desired start number to the document data.

Apart from the above-mentioned page printing function, the present invention has operation mode such as the continuous read function (continuous input function). The continuous read function is in a mode in which input processing of the original image is continued until a prescribed instruction (read end instruction or the like) is received from the user. This is a mode which makes it possible to process a plurality of mutually independent document data entered by a plurality of input operations during the period before input of user's prescribed instruction as a single job (for example, execution of the print processing as a single job, a registration processing of a single job in a memory box, or transfer processing of a single job to another device) (a function which permits handling of a plurality of mutually independent original images entered through a plurality of runs of input as a single job).

Environments of use of the above-mentioned mode include a case where it is necessary to enter the original in a plurality of runs of inputting via a document feeder (DF) because, for example, of the necessity to process large quantities of bundles of originals that are impossible to load at one time onto the original tray of the DF which has an original-conveying function, and a case where the user directly sets sheets of original on an original read table (on the platen glass 15) and causes inputting of the document data sheet by sheet in the platen read mode (non-DF mode) in which read operation of the original image is caused in units of sheets (in units of pages). In such circumstances, it is possible to make the image processing apparatus operable so as to process a plurality of mutually independent document data entered in a plurality of runs of input as a single job by previously selecting the above-mentioned continuous input function (by bringing the function into a valid state).

This makes it possible to execute user's desired processing such as printing a plurality of document data entered through a plurality of runs of input during the period before the receipt of a prescribed instruction of the user as document data of a single job, storing them in a prescribed box in the memory, and transferring them to another device.

Figure 8:
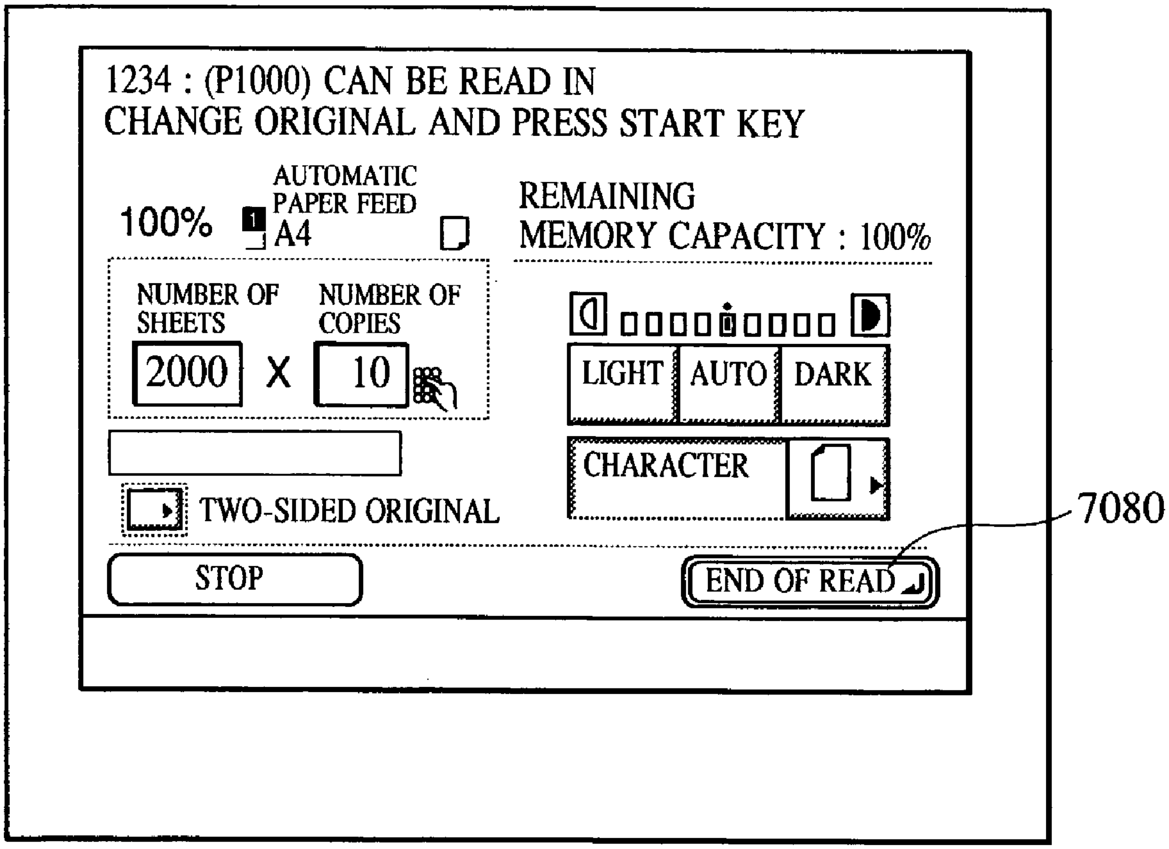
FIG. 8 illustrates a typical operational screen.

The setting method and display control of the aforementioned continuous input function (continuous read mode) will now be described with reference to FIG. 7. FIG. 7 illustrates a typical operation screen and a typical change in display of the operating section 7 in this embodiment. As shown in FIG. 7 and FIG. 8 described later, display screen data of the screens are stored in a prescribed memory, and the contents forming the display of these screens and changes in display are controlled by, for example, the CPU 33 of the controller section 110.

The setting method in the operating section 7 will be described since explanation here is based on the copying function in which an image from the scanner is mainly printed in the printer section. The image processing apparatus of this embodiment has a printing function of printing data for printing from an external computer. When using the printing function, therefore, a printer driver or the like of the host computer having delivered the printing data is caused to display the operating screens as shown in FIGS. 7A to 7D and FIG. 8 described later on the display screen of the host computer, and various setups described later are performed via the user's operation using the keyboard or the mouse, thereby permitting the printing of desired printing data in the image processing apparatus on the basis of the displayed instruction.

Figure 5:
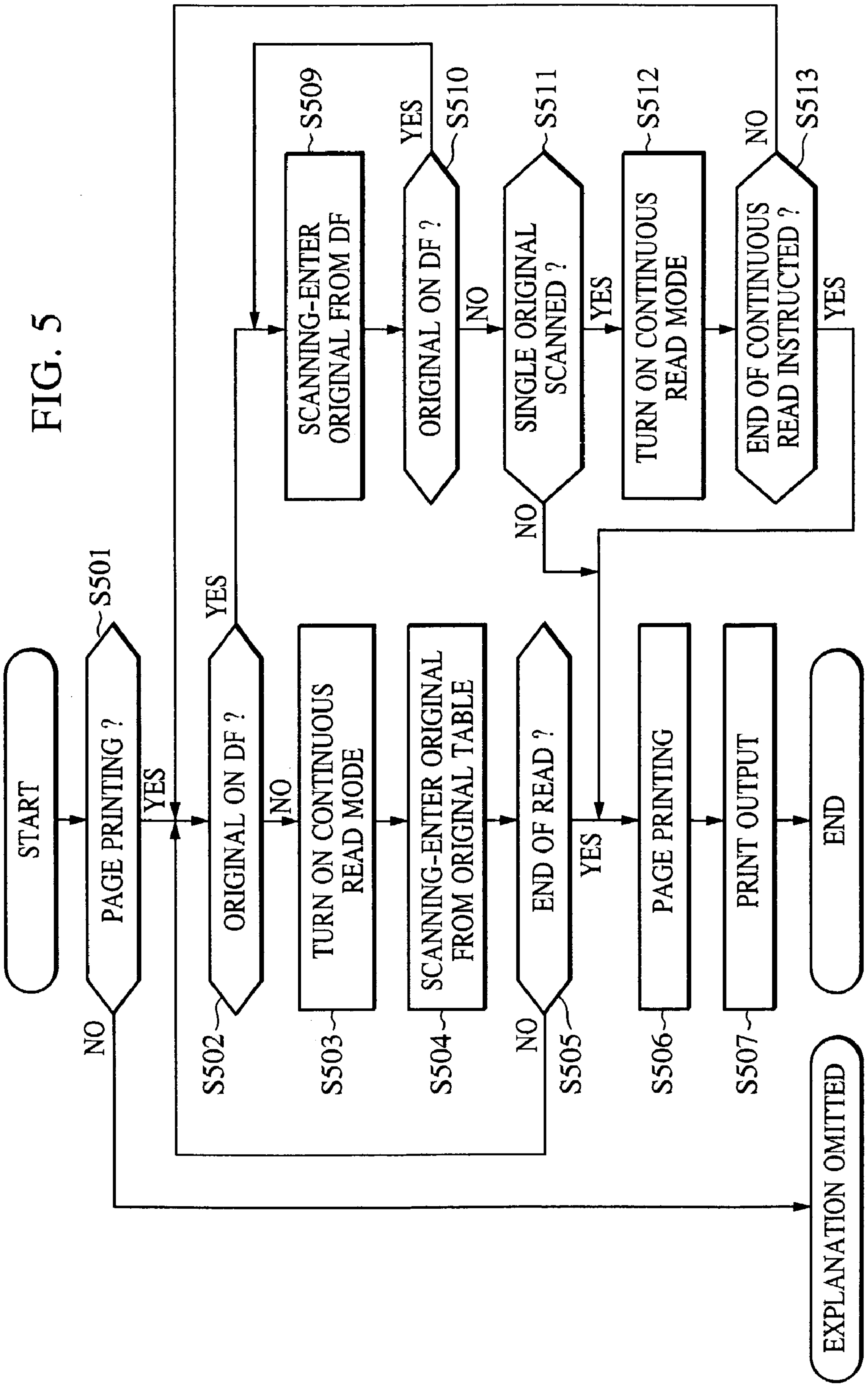
FIG. 5 is a flowchart illustrating page printing operation in an embodiment of the invention.
Figure 6:
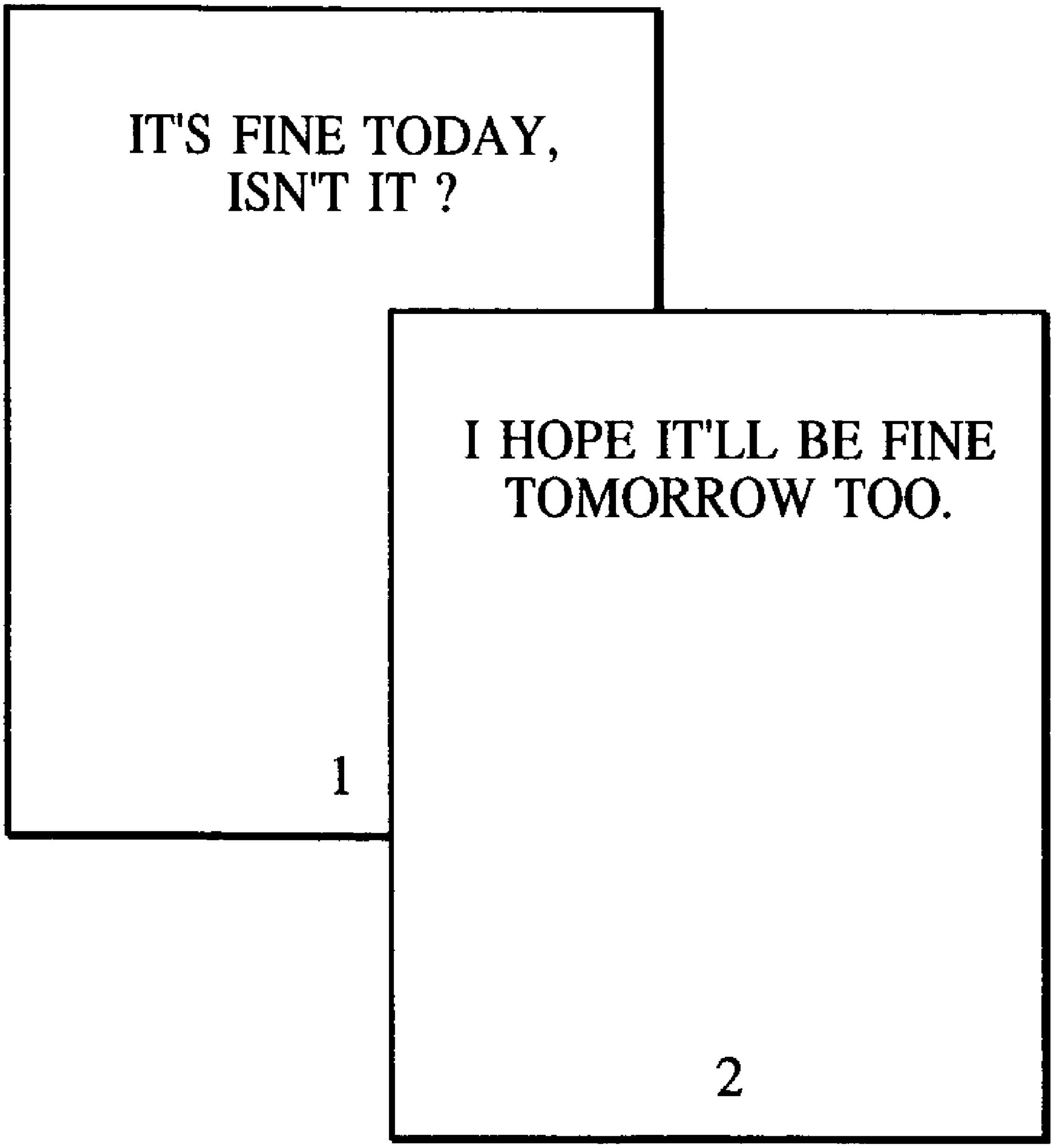
FIG. 6 illustrates a typical output of a page-printed recording sheet.

The image processing apparatus of this embodiment has also a memory box function including registration of data from a scanner or a PC into a memory box (not shown) of the hard disk 8, reading document data stored in this memory box therefrom and printing the same in the printer section, moving the same to another box, and transferring the same to another device. As a result, the above-mentioned continuous input mode and the page printing mode can be used in any other functions (copying/printer/box/facsimile, etc.) and various controls described later with reference to FIGS. 5 to 7 are thus made executable.

Even when all the plurality of functions (copying/printer/box/facsimile, etc.) are not available, this embodiment of the invention is applicable if the configuration contains at least any one of these functions.

FIG. 7A illustrates a basic screen (initial screen) of print setting screen. First, in response to user's selection of an application mode button 7000 on the setting screen shown in FIG. 7A, the contents of display is switched over from the screen of FIG. 7A to a setting screen of FIG. 7B.

The screen of FIG. 7B is an application mode setting screen. In addition to the one-side print/two-side print mode and the sort mode, the apparatus has a plurality of image processing modes such as the binding mode, the image synthesis mode, the reduced layout mode, and the enlarged layout mode. The user can therefore select the user's desired operational mode from among the above-mentioned operational modes via the setting screen shown in FIG. 7B. The user may select only one from among the plurality of modes, or may select a plurality of modes within a reasonable range (i.e., up to some limit).

When the user selects the continuous red button 7020 on the setting screen of FIG. 7B, the above-mentioned continuous read mode is brought into a valid state (ON). After the user presses the closing button 7030 on the screen, control is performed so that the display returns to the basis screen (see FIG. 7C).

At this stage, the continuous read function has already been set by the user for the document to be printed. For the purpose of further improving operability, therefore, control may be performed so as to execute a display so that the completion of setting of the continuous read function is identified by the user, as in a typical basic screen shown in FIG. 7C. For example, a button 7060 is displayed on the basic screen of FIG. 7C. The button 7060 on the screen of FIG. 7C may be made pressable by the user, and release or revalidation of the above-mentioned continuous read function in response to the user's ON/OFF operation of the button may be directly made executable without the need to conduct processing such as re-display on the setting screen of FIG. 7B or re-setting on the screen of FIG. 7B. This permits clarification of the setting status and simplification of operations. All the printing setting conditions for the printing job including turnoff of the continuous read function may be cancelled (bringing it back to the initial set value) in response to the user's pressing the cancel button 7050. Such a configuration permitting improvement of operability may be adopted.

Upon the completion of setting of all the processing conditions including setting of the continuous read function as described above, and in response to the user's pressing the start button (this may be a read start button on the setting screen of FIG. 7C), the CPU 33 causes the reader section to start read operation of the original placed directly by the user on the ADF or the original read table (on the platen glass 15), causes the reader to execute the read operation until there is no original to be read, and sequentially stores the entered image data in the memory. Input processing of the document data to be printed is thus continued until the input-processable documents are exhausted.

A series of input processing is considered to have been completed (for example, when all the originals on the DF have been read, or when the original on the originals table have been read in the platen mode, or when originals readable at a time have been processed, and there is no original to be processed). Determination and control to be made by the CPU 33 are as follows. Although input processing has been completed for the time being, the continuous read function is active (in a valid state) by initial setting. The CPU 33 does not therefore determine that the input processing has been completed for all the document data, but considers that there are still document data to be entered without causing transfer to the next processing step (for example, the printing operation, box registration, or transmission to another device) following the data input processing step, and causes display, for example, of a screen as shown in FIG. 8 on the operating section.

FIG. 8 illustrates an operating screen in the continuous read mode. When there remain originals to be entered, the user sets new originals to be entered on the DF or the original table in compliance with the contents of display on the screen shown in FIG. 8, and operates the start key of the operating section. As a result, the CPU 33 causes again the reader section to execute the input processing to continue a series of input processing steps in response to the operation by the user. When there is no further original to be entered, on the other hand, the user presses the read end button 7080 to inform the apparatus of the absence of further originals.

In response to this read end instruction from the user who presses the read end button 7080 as described above, the CPU 33 performs control so as to handle the plurality of mutually independent document data entered through a plurality of runs of input processing during the input processing step as a single job, and causes execution of a desired processing. For example, CPU 33 causes execution, in accordance with user's instruction, of two-side copying, reduced-size layout printing, registration in the memory box, or transfer to other devices for these plurality of mutually independent document data in a lump as a single job.

The aforementioned control will now be described by means of concrete examples. For example, when two-side printing document data entered through three runs of input as a single job, the steps are as follows.

First, the user sets an original on the DF or the platen glass 15 for the first run of input, sets various print modes including setting of two-side printing" and "continuous read function", and then, presses the start button. In response to this, the CPU 33 causes the reader to execute the first run of input processing. Upon the completion of the first input processing, the CPU 33 causes the display section to display the operational screen of FIG. 8. Then, the user sets an original for the second run of input and presses the start button. In response to this, the CPU 33 causes execution of the second run of input processing. Upon the completion of the second run of input processing, the CPU 33 again causes display of the operation screen of FIG. 8 on the display section. Then, the user sets an original for the third run of input and presses the start button. In response to this, the CPU 33 causes the reader to execute the third run of input processing. Upon the completion of the third run of input, the operation screen of FIG. 8 is displayed again. At this stage, the user presses the read end button 7080 of the operation screen of FIG. 8. In response to this, the CPU 33 determines that all the steps of input have been completed. The plurality of document data entered through the first to the third runs of input processing and held in the memory are sequentially read out from the memory in the order of pages (input sequence). Until total exhaustion of data to be printed, the CPU 33 causes the printer section to execute two-side printing on two sides of a single recording sheet, on the surface and the back thereof.

By setting the continuous input mode as described above, it is possible to handle document data entered through the plurality of runs of input as a single job.

The setting method regarding the page printing operation (page print mode) and the control thereof will now be described with reference to the screen shown in FIG. 7.

When an application mode button 7000 on the basic screen of the print setting screen shown in FIG. 7A is pressed by the user, the CPU 33 causes switching of the contents of the display from the screen of FIG. 7A to the setting screen of FIG. 7B.

When the user selects the page printing button 7010 from among the plurality of processing modes in the application mode setting screen shown in FIG. 7B, the CPU 33 brings the page printing mode into a valid state (ON) for the document data to be printed.

In this embodiment, when the user specifies the page printing mode from among the plurality of operating modes of this apparatus via a setting screen as shown in FIG. 7B, the CPU 33 sets the page printing mode (the various functions are brought into a valid state), and performs control so as to automatically set also the above-mentioned read mode (the various functions are brought into a valid state), irrespective of whether or not the user has selected the continuous read mode via the continuous read button 7020, i.e., irrespective of user's mode selecting status. The term the valid state as used herein means that, when document data processing is started in this state as it is, the processing based on the valid state mode is executed for the document data. In this state, the processing in this mode has not actually as yet been executed for the document data to be processed. At this stage, therefore, the processing can be cancelled.

As described above, the continuous read function is automatically set (brought into a valid state) in conjunction with user's selection of the page printing function. The reason is as follows. For example, the page printing function makes it possible to impart a page number in units of page to document data (original image data) to be processed, as described above. Therefore, the page printing function is selected by the user himself or herself, taking into account that there are highly probably document data the user desires to process corresponding to a plurality of pages, and that there is hardly conceivable a case where there is only one page of document data to be processed, in spite of the user's selection of the page number function. In addition, the user may fail to set the continuous read function even when the user must originally set the continuous read function, together with the page printing function since the page printing function and the continuous read function are independently set. Even when the user fails to set the continuous read function, the CPU 33 automatically sets the continuous read function when the user selects the page printing function, thereby permitting improvement of operability. This control is carried out for the reasons as described above.

The relationship between the continuous read mode and the page printing mode is as follows. When the user selects the continuous read mode from among the plurality of image processing modes, the CPU 33 prohibits execution of processing such as automatically bringing the page printing mode, together with the continuous read mode, but causes only the continuous read mode to be brought into a valid state. When the page printing mode is not specified by the user, on the other hand, the CPU 33 performs control so as to automatically bring the page printing function as well as the continuous read mode into a valid state, irrespective of whether or not the user simultaneously specifies the continuous read mode.

Regarding the above-mentioned control in this embodiment, when the user enters an instruction of the page printing mode via the page printing button of the setting screen shown in FIG. 7B, control may be made so that the continuous read mode is started up simultaneously with the page printing mode for the document data (job) to be processed. As shown in the flowchart described below, the configuration may be such that, when the user issues an execution instruction for the page printing mode, and in response to prescribed conditions (such as the determination in step S502 shown in FIG. 5, or determination in step S511), the page printing mode and the continuous read mode are automatically set.

In this embodiment, when the user selects the page printing button 7010 on the application mode screen shown in FIG. 7B causes display of a detailed setting screen for performing detailed setting of the page printing mode, and it is made possible for the user to set details such as the printing position and the type face via the detailed setting screen of the page printing mode. For example, there are included specification of positional information of the page number data to be provided on the sheet to bear the document data printed thereon (setting of the position of the page number at right bottom corner, at bottom center, or at left bottom corner), specification of a character size and a kind of font for the page number information (setting of an image size of the page number and a kind of font for printing), specification of a color for characters of the page number information (setting of a color for printing the page numbers), and specification of a printing start numeral of the page information (setting for the user to specify the numeral for the first page number. For example, when the user sets a page start number “2”, the CPU 33 causes prescribed processing to be executed for each unit, giving a page number “2” to the document of the first page, giving a page number “3” to the document of the second page, and assigning page numbers in units of page to the subsequent pages of document so that the page numbers are continuous. The CPU 33 ensures execution of the page number printing in accordance with the above-mentioned set conditions set by the user. The configuration in which detailed setting by the user is omitted may be adopted.

Upon the completion of setting of the page printing mode by the user, the CPU 33 carries out display and control so as to return to the basic screen.

In this embodiment, when the user selects the page printing mode, the page printing mode as well as the continuous read mode are automatically brought into a valid state. Therefore, with a view to achieving a further improvement of operability, for example as shown in the basic screen given in FIG. 7D, the setting screen may have a display (button 7070) making it possible for the user to identify that the page printing mode has already been set, or a display (button 7060) making it identifiable for the user that the continuous read mode has already been set. These modes may be individually ON/OFF-controlled via a screen for each mode so that these button is pressed by the user to permit release of the page printing mode (converting the valid state into the invalid state) in response to user’s operation of the button 7070, or release of the continuous read mode in response to user’s operation of the button 7060.

As is clear from the above description, control is performed so as to automatically bring the continuous read function into a valid state in response to user’s selection of the page printing function. In some cases, however, there may be circumstances under which the user does not desire the execution of the continuous read function. Therefore, the configuration may be such that, for example, as shown in the screen of FIG. 7D, the user is informed of the automatic setting (into a valid state) of the continuous read mode in linkage with the selection of the page printing mode, and the user watching such information can appropriately cancel the continuous read mode via the button 7060 at this stage.

Not automatically executing the continuous read mode uniformly and forcedly in conjunction with setting of the page printing function by the user as described above, but a preferred embodiment of the invention may comprise the steps of bringing the continuous read mode into a valid state as print setting conditions, informing the user of this fact, waiting for the user’s processing start instruction in this state, obtaining the user’s acknowledgement, and performing control so as to execute the page printing function as well as the continuous read function. In this configuration, the user’s intent is followed exactly while improving operability.

When the above-mentioned setting is made, the display returns to the basic screen as shown in FIG. 7D, and the user confirms the mode and presses the start button 7040, the CPU 33 performs control so as to execute the page printing function as well as the continuous read function.

A concrete example of the above-mentioned control will be described with reference to the setting screens shown in FIGS. 7 and 8. In this example, there are assumed to be document data corresponding to two sheets of original desired by the user. It is assumed also that the user sets the originals sheet by sheet on the original table (on the platen glass 15) of the reader section, and causes input processing in two runs of input. Page numbers are assigned to these documents as a single job to subject the same to printing. Under such circumstances, the user and the apparatus mutual work as follows.

First, the user sets the first original on the original table of the reader section of the apparatus, and processes the application mode on the basic setting screen shown in FIG. 7A by setting in the operating section. In response to this, the CPU 33 switches over the operating screen to the application screen shown in FIG. 7B. Then, the user instructs execution of the page printing mode by pressing down the page printing button 7010 of the setting screen of FIG. 7B, and simultaneously, conducts detailed setting of page printing. In response to this, the CPU 33 brings the page printing mode into a valid state, and automatically brings the continuous read function also into a valid state for the document data to be printed. Then, the display is caused to return to the basic screen as shown in FIG. 7D. Then, the user confirms various print set conditions via the screen of FIG. 7D, and sends a print start instruction by pressing the start button 7040. In response to this, the CPU 33 causes the reader to input-process the first original on the original table (on the platen glass 15), and stores the document data in the memory. Upon the completion of the input processing of the first original, the operating screen for the continuous read mode is displayed as shown in FIG. 8 on the display section.

In the steps up to this point in time, the input processing has not as yet been completed for all the originals. The user therefore removes the first original from the original table while watching the display on the setting screen of FIG. 8 displayed on the operating section, and in this place, sets a second original on the original table. At the same time, the user presses down a start key not shown without pressing a button 7080 for continuous read end instruction on the setting screen of FIG. 8.

In response thereto, the CPU 33 causes the reader to perform input processing of the second original, and stores the same in the memory in the same manner as above. Upon the completion of input processing of the second original, the CPU 33 displays the screen for the continuous read mode of FIG. 8 again on the operating screen.

At this stage, the two original to be processed are stored in the memory, and the input processing of all the data to be processed has been completed. The user therefore presses down the read end button 7080 on the setting screen of FIG. 8.

In response to this, the CPU 33 determines that all the read operations have been completed, and causes the processing to move to the printing process. For printing processing, the printer section is first controlled so as to print the first original data retained in the memory through the first run of input onto a first recording sheet. In this step, the print processing is carried out, in a state in which a page number "1" is given, at a position corresponding to user's page printing details setting instruction (right bottom corner, left bottom corner or bottom center) on the first recording sheet, with a size, a font and a color in response to the user's page printing details setting instruction (without these items of instruction, the initial values may be adopted). Then, the printer section is controlled so as to print the second original data stored in the memory through the second run of input onto a second recording sheet. Control is performed so as to print a page number "2" at the same position as above (in the same manner as in the first recording sheet) on a second recording sheet with the same size, font and color as above.

Output processing is thus completed under the print setting conditions including the page printing mode and the continuous read mode automatically set in linkage with the page printing mode and the selection of this mode, for the plurality of mutually independent sets of document data stored in the memory after two runs of input processing. The result of output is for example as shown in FIG. 6.

The above-mentioned example has covered a case of control in a mode for carrying out input processing from the scanner and print processing in the printer section. As described above, however, this control is applicable also in a mode for conducting input processing from an external device and print processing (printer mode or facsimile mode), a mode for performing input processing from the scanner or an external device and registration processing into the box in the memory of the apparatus (box registration mode), or a mode for carrying out data read processing from the box, print processing, or transfer processing to other apparatus or transfer processing to another box. This is also the case with an embodiment described with reference to the flowchart of FIG. 5.

<Page Printing Operation>

The page printing operation (same definition as the aforementioned page printing function and page printing mode) carried out in the image input/output system having the above-mentioned configuration will now be described in detail with reference to the flowchart of FIG. 5.

(I) Operations when reading in the original from the platen glass 15:

Operations when reading in the original from above the platen glass with the valid page printing function will be described with reference to steps S501 to S507.

In step S501, the CPU 33 of the controller section recognizes an operating mode requested by the user in the operating section 7 by means of an input from the panel I/F 62 via the LCD controller 60 and the I/O control section 51. For example, setups of the operating mode (image processing mode) including setups of the page printing operations are confirmed by referring to the memory storing printing conditions set by the user via various setting screens shown in FIG. 7. In this embodiment, a case of a copying machine representing the image processing apparatus capable of printing the page information is described. When non-execution of page printing is selected in step S501, the selection results in an operation not directly related to the present invention. The description thereof is therefore omitted here.

When the page printing operation (including page printing function and page printing mode) is included in the operating modes requested by the user, in step S501, the CPU 33 transfers the process to step S502. In step S502, the CPU 33 determines whether or not an original is placed on the tray of the original feeding unit 10 (DF). The presence or absence of an original on the original feeding unit 10 can be detected at any time by a sensor capable of detecting the presence of an original on the original tray of the original feeding unit 10. The information of presence or absence of an original on the tray is notified asymmetrically to the CPU 33 upon every update of the information via the scanner unit 11 and the scanner I/F 46 of the controller section 110. From the thus notified information, the CPU 33 determines the presence or absence of an original on the original feeding tray of the DF (original feeding unit 10).

When absence of an original on the original feeding unit 10 is determined in step S502, the CPU 33 advances the process to step S503. When the image processing apparatus has no original feeding unit 10, the CPU 33 forcedly sets forward the process to step S503.

In step S503, because there is no original on the tray of the original feeding unit 10, the CPU 33 determines that an original is placed on the platen glass 15 of the original read table, and makes preparations for entering the original on the platen glass. When the scanner unit 11 can recognize the original size, the original size information is obtained via the scanner I/F 46. When the size is not established, or when the scanner unit 11 has not a function of detecting the original size on the platen glass 15, the CPU 33 urges the user to enter the size of the original to be read.

In step S503, because an instruction to execute the page printing operation from the user has already been recognized, the CPU 33 forcedly (automatically) validates (ON) the "continuous read mode" (including the continuous read function) which makes it possible for the user to scan bundles of originals continuously from the platen glass 15 or the original feeding unit 10. The fact that the "continuous read mode" is now valid is notified to the user via the panel I/F 62 by, for example, causing the operating section to display the setting screen shown in FIG. 7D having a button 7060 permitting notification to that effect.

The term the "continuous read mode" means a mode in which, upon reading an original from the platen glass 15 or from the original feeding unit 10, while it is the usual practice to execute processing with one or more originals as an original bundle, input of the next original is requested upon the completion of scanning of the original on the platen glass 15 or after scanning all the originals on the original feeding unit 10. When the "continuous read mode" is valid, execution of input of the originals is continued unless the user explicitly instructs the end of read. Upon the user's instruction to end read (for example, the user instructs end of read by operating the button 7080 on the setting screen of FIG. 8), the originals so far entered are processed as an original bundle (a single job).

When the "continuous read mode" becomes valid, the process advances to step S504, and the CPU 33 executes read of the original on the platen glass 15. The CPU 33 requests scanning to the scanner unit 11 via the scanner I/F 46. Upon receipt of this request, the scanner unit 11 enters the original image into the CCD 22 in the above-mentioned procedure, and transfers the image information to the controller section 110.

The controller section 110 writes the received image information into the DRAM 38 under control by the bus controller 34. The image entered into the DRAM 38 is image-compressed by the CODEC 40 in compliance with the instruction of the CPU 33, and recorded and stored in the hard disk 8 via the I/O control section 51 and the E-IDE connector 63. In this process, the CPU 33 simultaneously records the read sequence in the hard disk 8 as page information (including the information permitting specification of the page number of the entered image in units of page).

Now that reading of the original on the platen glass 15 has been completed, in step S505, the CPU 33 requests the user's acknowledgment about the presence or absence of an original to be scanned next via the panel I/F 62. The CPU 33 writes for the user's acknowledgement and instruction by displaying, for example, the setting screen of FIG. 8. For example, when the user specifies absence of the next original (i.e., that no further original is present) by pressing the read end button 7080 on the setting screen of FIG. 8, the CPU 33 advances the process to step S506. When the user selects continuation of reading in step S505 by pressing down a start key (not shown) by setting a new original, without pressing the read end button 7080 on the setting screen of FIG. 8, on the other hand, the CPU 33 returns the process to step S502 to prepare for inputting of the next and subsequent originals.

In step S506, the CPU 33 executes page printing. The page printing is performed on the basis of the page information stored together with the image information in step S504 (for a concrete example of the page printing mode, see the above description).

In this embodiment, description is omitted about the processing for forming the page information into a visible image. For example, the CODEC 40 of the controller section 110 may have font information to add a page number to the image information upon extension of the image, or the CPU 33 may directly draw an image through bit operation for the extended image in the RAM 38. Upon forming an image by the printer I/F 48 on the printer section 6, a visible image may be formed to add to the image information. In this embodiment, a case where the CPU 33 forms a visible image from the page information (page number) will be described.

More specifically, in step S506, the CPU 33 reads out the page information and the entered image information from the hard disk 8. Since the image information is image-compressed, it is transferred to the CODEC 40 to depress the same into a bit-map image, and for deployment in the DRAM 38. The CPU 33 adds the page information as bit map data to the image information for the bit-map image on the DRAM 38 on the basis of the page information read out from the hard disk 8 (that is, performing a synthesizing processing of the image data of the entered original and the page data corresponding to the page numbers of the original, for each page of the entered original), and advances the process to step S507.

In step S507, the CPU 33 transfers the bit-map image having the page information formed on the DRAM 38 (synthesized image data generated through the synthesizing processing of the page numbers and the original image) to the marking unit 13 via the printer I/F 48. The marking unit 13 forms the visible image as described above, and forms a bit-map image on a recording sheet for output.

When the page printing is specified by the user as described above, upon reading in the original from above the platen glass 15, time and labor of the user are reduced by automatically bringing the continuous read mode into a valid state, thereby permitting continuous scanning of the original and printing the page information onto the recording sheet as shown in the example of output illustrated in FIG. 6.

When the user wishes to cancel the continuous read mode started up automatically from among the two modes, as described above, this may be accomplished by, for example, displaying a setting screen for confirmation as shown in FIG. 7D between step S503 and S504, thus making it possible for the user to appropriately cancel the mode via the button 7060 or the like (bringing the valid state into the invalid state).

(II) Operation of Reading the Original From the Original Feeding Unit 10:

Processing in a case where, when the page printing function is brought into a valid state, and only one original is read in from the original tray of the ADF (original feeding unit 10) will now be described in detail along a sequence defined by steps S501, S502, and S509 to S513.

The processing when step S502 gives a positive determination will mainly be described. The processing preceding step S502, including the processing in step S501 and the user's setting of various operating modes is the same as in the above description.

When the presence of an original on the original tray of the original feeding unit 10 is determined in step S502 from the result of output from an original detecting sensor not shown for detecting presence or absence of an original in the unit 10, the CPU 33 moves the process to step S509.

In step S509, the CPU 33 causes the input processing of the original on the tray of the original feeding unit 10 to be started. For example, the CPU 33 conveys the original set on the tray to the original read position (position where the original is read by the CCD 22). When the original feeding unit 10 can recognize the original size, the original size information is obtained via the scanner I/F 46. For example, original size information is available by obtaining an output of the result of size detection from an original detecting sensor (not shown) provided on the original conveying path in the ADF before reaching the original read position. When the size is not established, or when the original feeding unit 10 does not have an original size detecting function, the CPU 33 urges the user to enter the size of the original to be read via the panel I/F 62.

The CPU 33 requests scanning via the scanner I/F 46 to the scanner unit 11. Upon receipt of the request, the scanner unit 11 enters the original placed on the original tray of the original feeding unit 10 and conveyed to the original read position as image information through the CCD 22, and transfers the image information to the controller section 110.

This processing is accomplished by sequentially subjecting the original already placed on the original tray of the ADF sheet by sheet from the top page side original to conveyance and read processing, and continuing such processing until the original on the original tray is exhausted. In this processing, the number of sheets of original already entered is previously counted by a counter, and the result is stored in the memory for use in a subsequent processing.

The controller section 110 writes the received image information into the DRAM 38 under control by the bus controller 34. The image entered into the DRAM 38 is compressed by the CODEC 40 in compliance with an instruction from the CPU 33, and recorded and stored in the hard disk via the I/O control section 51, and the E-IDE connector 63. In this case, the CPU 33 records the read sequence (the original of the top page is assigned the first page, and the subsequent originals are sequentially assigned the following page numbers) as page information simultaneously in the hard disk with reference to the count information from the number of originals counter and setting information from the operating section.

Through the processing in step S509, all the originals enterable at a time (all the originals having been placed on the original tray at the stage of start of the original input in step S509) are stored into the memory, and upon the completion of a series of original read operations, it is confirmed whether or not there is an original for which input is not as yet completed on the original feeding unit 10. For example, when a notice of absence of an original from the original presence detecting sensor on the original tray of the ADF is received, the CPU 33 determines that there is no original on the DF. When the CPU 33 determines from output from the sensor that there are following originals, on the other hand, the CPU 33 returns the process to step S509 to perform input of original. When there is not following original in step S510, the CPU 33 advances the process to step S511.

In step S511, the CPU 33 confirms the number of originals read in step S509, for example, on the basis of information from the number of originals counter not shown. When the number of entered originals in the processing in step S509 is determined to be one, the CPU 33 sets forward the process to step S512, to forcedly (automatically) bring the "continuous read mode" into a valid state (turning on the continuous read function), and inform the user that the "continuous read mode" is now valid via the panel I/F 62. For example, as shown in FIG. 7D, the display section is controlled so as to permit the user's confirmation of the automatic setting of the continuous read function under the page printing function set by the user's operation.

When it is determined that there are a plurality of originals read in step S511, the CPU 33 advances the process to step S506 to conduct page printing in the same manner as above.

In this embodiment, when the page printing mode is selected by the user, and there are a plurality of originals entered from the ADF in the processing in step S509, control may be performed so as to perform printing in the page printing mode without automatically setting the continuous read mode, or as in the above-mentioned case using FIGS. 7 and 8, control may be performed so that the printing is executed in a state in which both the page printing mode and the continuous read mode are in a valid state, by automatically bringing the continuous read mode into a valid state even when the number of originals entered from the ADF is only one, upon setting the page printing mode.

After bringing the "continuous read mode" into a valid state in step S512, the CPU 33 sets forward the processed to step S513, and urges the user to confirm via the panel I/F 62 the presence or absence of the next original to be entered anew. When the user determines that there is no following original, (when determination in step S513 is YES), the CPU 33 advances the process to step S506, and performs page printing in the same manner as above. When the user selects continuance of read in step S513 (determination in step S513 is No), the CPU 33 returns the process to step S502.

For example, as a processing in step S513, the CPU 33 causes display of an operating screen under the continuous read mode, as shown in FIG. 8. The CPU 33 determines from the result of detection of the user's button operation whether or not the user has pressed the button 7080 for entering the original read end instruction on the screen of FIG. 8, and whether or not the user has pressed the start key (not shown) without pressing the button 7080. When an continuous read end instruction is entered by user's pressing the button 7080 in the operating screen of FIG. 8 (determination in step S513 is Yes), the CPU 33 conducts control so as to treat all the image data already stored in the memory through the processing in step S509 during the period before processing in step S513 as image data included in a single print job. For example, with these image data as a single job, in step S506, the corresponding page number is assigned in accordance with the page details setting conditions specified by the user on the basis of the page information stored in the hard disk, the page-printed data are printed in step S507. When a new original is set by the user on the original tray on the ADF, and the start key of the operating section is pressed anew, without pressing the button 7080 in the operating screen of FIG. 8, to instruct continuance of continuous read (determination in step S513 is No), the CPU 33 determines that there still remain following originals to be entered, and returns the process to step S509, performing control so as to conduct the same processing as above again.

When the user specifies page printing, as described above, and the number of originals read from the original feeding unit 10 is one, the user's time and labor for operation are-reduced by bringing forcedly (automatically) the "continuous read mode", and it is made possible to print the page information as shown in the example of output shown in FIG. 6 by continuously scanning the original.

When the number of entered originals is one, a function enabling the user to set selection as to whether or not the page information is to be added, or whether or not the total number of one is to be added explicitly to the image information for output may be provided, and the units may be made controllable by the CPU 33 in accordance with such user's selection.

Control may be performed so that an output result as shown in FIG. 6 is obtained by causing a synthetic (i.e., synthesizing) processing of document data and page numbers on the image memory, and printing the synthesized image data with page numbers on the sheet. Control may be made so as to obtain an output result as shown in FIG. 6 by directly printing the document data and the page numbers onto the sheet.

As in the above-mentioned example, all of the plurality of mutually independent document data may be printed (continuous printing) in a lump by the printer as in the aforementioned example, in the state in which the page numbers are assigned through execution of the page printing mode, these document data being deemed as a single job through execution of the continuous read mode. These plurality of document data processed in these modes may be stored in a lump in the box of the hard disk, or may be transferred in a lump to an external device (a host computer, a remote facsimile machine, or a remote copying machine). The CPU 33 may select an output processing to be executed from among blanket printing by the printer, blanket storing in the box, blanket transfer to another device, on the basis of the print setting conditions from the user, so as to ensure execution of output processing based on user's instruction.

The above-mentioned control method can be achieved by storing and operating programs in compliance with the flowchart shown in FIG. 5 described above in the ROM 36 in the controller section 110.

The apparatus of the present invention is not limited to the apparatus of the above-mentioned embodiment, but the invention may be applied to a system composed of a plurality of devices, or to an apparatus composed of a single device. It is needless to mention that the invention is perfected also by supplying a memory medium storing the software programs for achieving the functions of the above-mentioned embodiment, and by calling and executing the program codes stored in the memory medium by the computer (or a CPU or an MPU) of such system or apparatus.

In this case, the program codes themselves read out from the memory medium achieve the functions of the aforementioned embodiment, and the memory medium storing these program codes would compose the present invention. Applicable memory media for supplying the program codes include a floppy disk (registered trademark), a hard disk, an optical disk, a magneto-optical disk, a non-volatile memory card, and a ROM. By executing the program codes read out by the computer, not only it is possible to achieve the functions of the aforementioned embodiment, but also, an SOS operating on the computer performs all or part of actual processing in compliance with the instruction of the program codes, and the function of the aforementioned embodiment are realized.

The functions of the aforementioned embodiment are achieved by writing the program codes read out from the memory medium into a expanded function board inserted into the computer or into a memory of a function expanded unit connected to the computer, and execution by a CPU of the expanded board or expanded unit of all or part of actual processing on the basis of instructions of the program codes.

In this embodiment, as described above, copying functions have been mainly described. This embodiment is, however, applicable also to functions including input processing of image data from an external device, such as printer and facsimile functions. This embodiment is also applicable to the box function including processing of storing input image data from a scanner or an external device in a box of a hard disk of the apparatus of the embodiment, or processing of reading out and outputting image data stored in the box. The embodiment is applicable also to a functional mode using at least a scanner unit by printing, storing in the box or transferring to an external device, document data to be processed, by means of a scanner unit such as that contained in the apparatus of this embodiment.

According to this embodiment, as described above in detail, when the user manually selects the page printing mode for document data (original image data, also called simply "a job") to be processed, the CPU 33 performs control so as to bring the page printing mode into a valid state, and bring the continuous input mode (continuous read mode) automatically, irrespective of whether or not execution of the continuous input mode is instructed from the operating section. The CPU 33 conducts control so as to sequentially process the document data to be processed in accordance with both the page printing mode and the continuous read mode.

In response to the input of an execution instruction of the page printing mode by the user, control may be made so as to bring the page printing mode, and at the same time, automatically bring the continuous read mode. Control may also be performed so as to bring only the page printing mode, or simultaneously with this, automatically bring the continuous read mode together with the page printing mode, upon input of the user's executing instruction of the page printing mode, in response to prescribed conditions (for example, determination whether or not the original is directly set on the platen glass 15 of the scanner unit, determination whether or not the original is set on the original tray on the DF unit as an original feeding unit of the scanner unit, and determination whether or not the number of entered originals from the DF unit is one; in short, the input form of the document by the user including the state of setting of the document, manner of setting and form of setting relative to the input device by the user).

When the page information output mode is manually specified by the user, control is performed so as to automatically start up the continuous read mode under prescribed conditions, including the determination that a sheet is placed on a prescribed read position, or detection that the total number of sheets placed on the tray of the automatic sheet feeding means is one.

Even when the continuous read mode is automatically started up by the CPU 33, control may be made so that the user confirms the acceptability thereof, and the continuous read mode is executed together with the page printing mode only after obtaining the user's consent, as shown in the operating screen given in FIG. 7D. When, upon request to confirm through the screen of FIG. 7D, the user determines that it is not necessary to execute the continuous read mode from among these two modes, control may be conducted so as to make the continuous read mode automatically brought into a valid state cancelable by the user via the button 7060 on the screen of FIG. 7D. Without performing a forced control, but control may be only on a recommendable level to provide the user with a margin of selection.

Through the processing as described above, it is possible to omit troublesome operations in page printing, and improve operability.

According to the present invention, it is possible to prevent occurrence of problems as in the conventional art, give consideration to the user's wishes, omit troublesome operations imposed on the user when conducting page printing, and thus to improve operability.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

an image reading section which reads in an image;

an image memory section which stores image information read in by said image reading section;

an image output section which outputs the image information stored in said image memory section;

page information output specifying means for specifying a page information output mode;

continuous read mode executing means which continuously executes reading of an image from said image reading section until a read end instruction is received, and stores the image in said image memory section; and page information adding means which, when said read end instruction is received, adds page information to the image information in said image memory section, wherein, when said page information output mode is specified, said continuous read mode executing means is automatically started up under a prescribed condition, and the image information and the page information which has been added thereto by said page information adding means are output from said image output section.

2. An image processing apparatus according to claim 1, further comprising determining means which determines that a sheet is placed at a prescribed read position of said image reading section, wherein the fact that said determining means determines that a sheet is placed at said prescribed read position is said prescribed condition.

3. An image processing apparatus according to claim 2, further comprising a tray capable of mounting a plurality of sheets, automatic sheet feeding means which conveys the sheets placed on said tray to said prescribed read position of said image reading section, and sheet detecting means which detects sheets placed on said tray, wherein said determining means uses at least the absence of a sheet on said tray as a condition for determining the presence of a sheet placed at said prescribed read position.

4. An image processing apparatus according to claim 3, further comprising sheet detecting means which detects the number of sheets placed on said tray of said automatic sheet feeding means, wherein detection of a sheet placed on said tray is used as said prescribed condition.

5. An image processing apparatus according to claim 1, further comprising means for specifying positional information of said page information to be added to the image information.

6. An image processing apparatus according to claim 1, further comprising means for specifying a size and font of said page information to be added to the image information.

7. An image processing apparatus according to claim 1, further comprising means for specifying color information of said page information to be added to the image information.

8. An image processing apparatus according to claim 1, further comprising means for specifying a page start number of said page information to be added to the image information.

9. An image input system having an image processing apparatus according to any one of claims 1 to 8.

10. A controlling method of an image processing apparatus that comprises an image reading section which reads an image, an image memory section which stores image information read by the image reading section, an image output section which outputs the image information in the image memory section, page information output specifying means for specifying a page information output mode, continuous read mode executing means which executes processing for continuously reading an image from the image reading section until an instruction of read end is received, and stores the image in the image memory section, and page information adding means which, when the read end instruction is received, adds page information to the image information in the image memory section, said controlling method comprising the steps of:

when the page information output mode is specified, automatically activating the continuous read mode executing means under prescribed conditions; and outputting the image information and the page information which has been added thereto by the page information adding means from the image output section.

11. A control program stored in a computer-readable storage medium for executing a controlling method of an image processing apparatus, comprising an image reading section which reads an image, an image memory section which stores the image information read by the image reading section, an image output section which outputs the image information in the image memory section, and image information output specifying means for specifying a page information output mode, wherein said control program comprises:

a continuous read mode executing step, of executing a processing for continuously reading an image from the image reading section until a read end instruction is received and storing the image in the image memory section;

a page information adding step, of adding the page information to the image information in the image memory section upon receipt of the read end instruction; and a controlling step, of, when the page information output mode is specified, automatically commencing execution of said continuous read mode executing step under prescribed conditions, and outputting, from the image output section, the image information and the page information which has been added thereto in said page information adding step.

12. A control program stored in a computer readable storage medium, for executing a control method for controlling an image processor comprising an image reading section for reading an image, an image memory section which stores image information read by the image reading section, an image output section which outputs the image information in the image memory section, and page information output specifying means for specifying a page information output mode, said control program comprising:

a continuous read mode executing step, of executing a processing of continuously reading an image from the image reading section until a read end instruction is received, and storing the image in the image memory section;

a page information adding step, of adding the page information to the image information in the image memory section upon receipt of the read end instruction; and a control step, of, when the page information output mode is specified, automatically commencing performance of said continuous read mode executing step under prescribed conditions, and outputting the image information and the page information which has been added thereto in said page information adding step from the image output section.

13. An image processing apparatus having a plurality of image processing modes, including at least a first mode, which permits assignment of page number information in units of pages to document data to be processed, and a second mode, which permits handling of a plurality of sets of document data independent of each other as document data as a job, said apparatus comprising;

a mode selector for allowing a user to select a desired image processing mode from said plurality of image processing modes; and a controller for bringing said first mode into a valid state and automatically bringing said second mode into a valid state irrespective of whether or not the user selects said second mode by means of said mode selector when the user has selected said first mode from among said plurality of image processing modes by means of said mode selector, wherein, when said first mode is specified, continuous read mode executing means is automatically started up under a prescribed condition, and the image information and the page information which has been added thereto are output from an image output section.

14. A control method comprising:

a mode selecting step, of causing a user to select a desired image processing mode from among a plurality of image processing modes including a first mode, which permits assignment of page number information in units of pages to document data to be processed, and a second mode, which permits handling of a plurality of sets of document data independent of each other as document data as a job; and a controlling step, of bringing said first mode into a valid state and automatically bringing said second mode into a valid state irrespective of whether or not the user selects said second mode in said mode selecting step when the user has selected said first mode from among said plurality of image processing modes in said mode selecting step, wherein, when said first mode is specified, continuous read mode executing means is automatically started up under a prescribed condition, and the image information and the page information which has been added thereto are output from an image output section.

15. A control method according to claim 14, wherein only said second mode is brought into a valid state without automatically bringing said first mode into a valid state when said second mode is selected from among said plurality of image processing modes in said mode selecting step.

16. A control method according to claim 14, wherein said controlling step includes bringing said first mode as well as said second mode into a valid state in response to the user's selection of said first mode from among said plurality of image processing modes in said mode selecting step.

17. A control method according to claim 14, wherein said controlling step includes bringing said first mode as well said second mode into a valid state in response to selection of said first mode in said mode selecting step and to the input form of the document data to be processed.

18. A control method according to claim 17, further comprising the step of:

making the document data to be processed enterable via a scanner unit of an image processing apparatus, wherein said controlling step includes bringing said first mode as well as said second mode into a valid state in response to the set state of the document data to be processed in said scanner unit when said first mode is selected in said mode selecting step.

19. A control method according to claim 18, wherein said controlling step includes bringing said first mode as well as said second mode into a valid state in response to the result of determination as to whether or not a document to be processed is present on an original tray of a scanner unit when said first mode is selected in said mode selecting step.

20. A control method according to claim 18, wherein said controlling step includes bringing said first mode as well as said second mode into a valid state in response to a result of a determination as to whether or not the number of entered documents via said scanner unit is one, when said first mode is selected in said mode selecting step.

21. A control method according to claim 14, wherein said document data to be processed is printed, together with the page number information, onto a sheet, by a printer unit of an image processing apparatus, by executing said first mode.

22. A control method according to claim 14, wherein, upon selecting said first mode, the user is allowed to set at least any one detailed setup selected from: a first detailed setup, making it possible to set a position at which said page number information is given to the document data; a second detailed setup making it possible to set a font for said page number information; a third detailed setup, making it possible to set a size of said page number information; and a fourth detailed setup, making it possible to set a page start number of said page number information.

23. A control method according to claim 14, further comprising a step of causing the user to execute mode selection in said mode selecting step via a display unit.

24. A control method according to claim 23, further comprising the step of causing the display unit to execute a display which makes it possible for the user to confirm the image processing mode brought into a valid state from among the plurality of image processing modes including said first mode and said second mode.

25. A control method according to claim 14, further comprising the step of making it possible for the user to release, for each image processing mode, an image processing mode brought into a valid state to document data to be processed from said plurality of image processing modes including said first mode and said second mode.

26. A control method according to claim 14, further comprising the step of continuing input processing of a plurality of mutually independent document data through execution of said second mode until a prescribed instruction from the user is entered.

27. A control method according to claim 14, further comprising the step of causing execution of an image processing mode brought into a valid state from among said plurality of image processing modes including said first mode and said second mode for document data to be processed in an image processing apparatus having at least a scanner unit.

28. A control method according to claim 14, further comprising the step of causing execution of an image processing mode brought into a valid state from among said plurality of image processing modes including said first mode and said second mode for document data to be processed in an image processing apparatus having at least any one function of a copying function, a facsimile function, a printing function and a box function.

29. A control method according to claim 14, further comprising the step of outputting all document data subjected to the processes of said first mode and said second mode in a lump through at least any one processing from among a print processing by a printer unit, a memory processing into the memory and a transfer processing for transfer to another device.

30. A machine-readable storage medium which stores a program for executing:

a mode selecting step, of causing a user to select a desired image processing mode from a plurality of image processing modes including a first mode, which makes it possible to add page number information in units of pages to document data to be processed, and a second mode, which makes it possible to handle a plurality of mutually independent sets of document data, as document data for a single job; and a controlling step, of bringing said first mode into a valid state and at the same time, automatically bringing said second mode irrespective of whether or not the user selects said second mode in said mode selecting step when the user has selected said first mode from among said plurality of image processing modes in said mode selecting step, wherein, when said first mode is specified, continuous read mode executing means is automatically started up under a prescribed condition, and the image information and the page information which has been added thereto are output from an image output section.

* * * * *

UNITED STATES PATENT AND TRADEMARK OFFICE

CERTIFICATE OF CORRECTION

PATENT NO. : 7,199,907 B2
APPLICATION NO. : 10/329377
DATED : April 3, 2007
INVENTOR(S) : Yasushi Shimizu It is certified that error appears in the above-identified patent and that said Letters Patent is hereby corrected as shown below:

COLUMN 3

Line 24, "discharge" should read --discharges--.
Line 30, "(Wide" should read --("Wide--.
Line 47, "original" (first occurrence) should read --originals--.
Line 50, "original" should read --originals--.
Line 54, "original" should read --originals--.

COLUMN 4

Line 38, "transmit" should read --transmitting--.

COLUMN 5

Line 32, "interpret" should read --interprets--.

COLUMN 6

Line 44, "mode" should read --modes--.

COLUMN 7

Line 29, "original" (first occurrence) should read --originals--.

COLUMN 8

Line 35, "red" should read --read--.

COLUMN 9

Line 48, "data entered" should read --data is entered--.

UNITED STATES PATENT AND TRADEMARK OFFICE

CERTIFICATE OF CORRECTION

PATENT NO. : 7,199,907 B2
APPLICATION NO. : 10/329377
DATED : April 3, 2007
INVENTOR(S) : Yasushi Shimizu It is certified that error appears in the above-identified patent and that said Letters Patent is hereby corrected as shown below:

COLUMN 10

Line 49, “page” (second occurrence) should read --pages--.

COLUMN 11

Line 29, “causes” should read --causing--.
Line 30, “and” should be deleted.

COLUMN 12

Line 3, “button is” should read --buttons are--.
Line 48, “mutual” should read --mutually--.

COLUMN 17

Line 2, “original” (first occurrence) should read --originals--.
Line 5, “original” (first occurrence) should read --originals--; and “is” should read --are--.
Line 6, “original” should read --originals--.
Line 67, “processed” should read --process--.

COLUMN 18

Line 16, “an” should read --a--.
Line 39, “are-reduced” should read --are reduced--.
Line 64, “These” should read --This--.

COLUMN 19

Line 37, “a” should read --an--.

UNITED STATES PATENT AND TRADEMARK OFFICE

CERTIFICATE OF CORRECTION

PATENT NO. : 7,199,907 B2
APPLICATION NO. : 10/329377
DATED : April 3, 2007
INVENTOR(S) : Yasushi Shimizu It is certified that error appears in the above-identified patent and that said Letters Patent is hereby corrected as shown below:

COLUMN 20

Line 60, "in" should be deleted.
Line 62, "in" should be deleted.

COLUMN 22

Line 67, "comprising;" should read --comprising:--.

Signed and Sealed this

Twenty-ninth Day of January, 2008

Jon W. Dudas

JON W. DUDAS
*Director of the United States Patent and Trademark Office*